United States Patent [19]

Macheboeuf

[11] Patent Number: 4,845,565
[45] Date of Patent: Jul. 4, 1989

[54] VIDEO SIGNAL MIXER DEVICE

[75] Inventor: Guy Macheboeuf, Pullay par Verneuil sur Avre, France

[73] Assignee: Telediffusion de France, Paris, France

[21] Appl. No.: 30,999

[22] Filed: Mar. 27, 1987

[30] Foreign Application Priority Data

Mar. 28, 1986 [FR] France ................. 86 04566

[51] Int. Cl.$^4$ ........................................... H04N 5/272
[52] U.S. Cl. ..................................... 358/183; 358/181
[58] Field of Search ............... 358/183, 182, 181, 180, 358/22

[56] References Cited

U.S. PATENT DOCUMENTS

| | | | |
|---|---|---|---|
| 2,653,186 | 9/1953 | Hurford | 358/183 |
| 3,598,908 | 8/1971 | Poulett | 358/182 |
| 3,604,849 | 9/1971 | Skrydstrup | 358/183 X |
| 3,619,495 | 11/1971 | Ito et al. | 358/183 X |
| 3,673,324 | 6/1972 | Ito et al. | 358/183 X |
| 4,684,990 | 8/1987 | Oxley | 358/183 |

FOREIGN PATENT DOCUMENTS

| | | | |
|---|---|---|---|
| 0160549 | 11/1985 | European Pat. Off. | |
| 0163695 | 4/1980 | Netherlands | 358/183 |
| 1228412 | 4/1971 | United Kingdom | |
| 2099258 | 12/1982 | United Kingdom | 358/181 |

*Primary Examiner*—James J. Groody
*Assistant Examiner*—E. Anne Farris
*Attorney, Agent, or Firm*—Lowe, Price, LeBlanc, Becker & Shur

[57] ABSTRACT

A mixer device designed for a TV production control room mixes incoming video signals of PAL, NTSC or MAC standard. To avoid any differences in video signal propagation time through a known video grid, the latter is suppressed, and a grid with narrower band width switches chopping signals selectively controlling attenuations of the incoming video signals in analog multipliers. The chopping signals are derived in operator circuits as a function of effect and dissolve signals designed to chop image planes to be superposed into a resultant image. In particular, amplitude complementarity of the chopping signals between two predetermined levels is ensured, whatever the dissolves and effects selected, and a proportion of a black image signal, transmitted normally during line and field blankings, is mixed during a black fade or a darkening to be created in the resultant image.

17 Claims, 11 Drawing Sheets

INVERTER-SUMMATOR $$\overline{SOM} = 1 - (a_1 + a_2 + \ldots + a_J)$$
$$= \overline{a_1 + a_2 + \ldots + a_J}$$

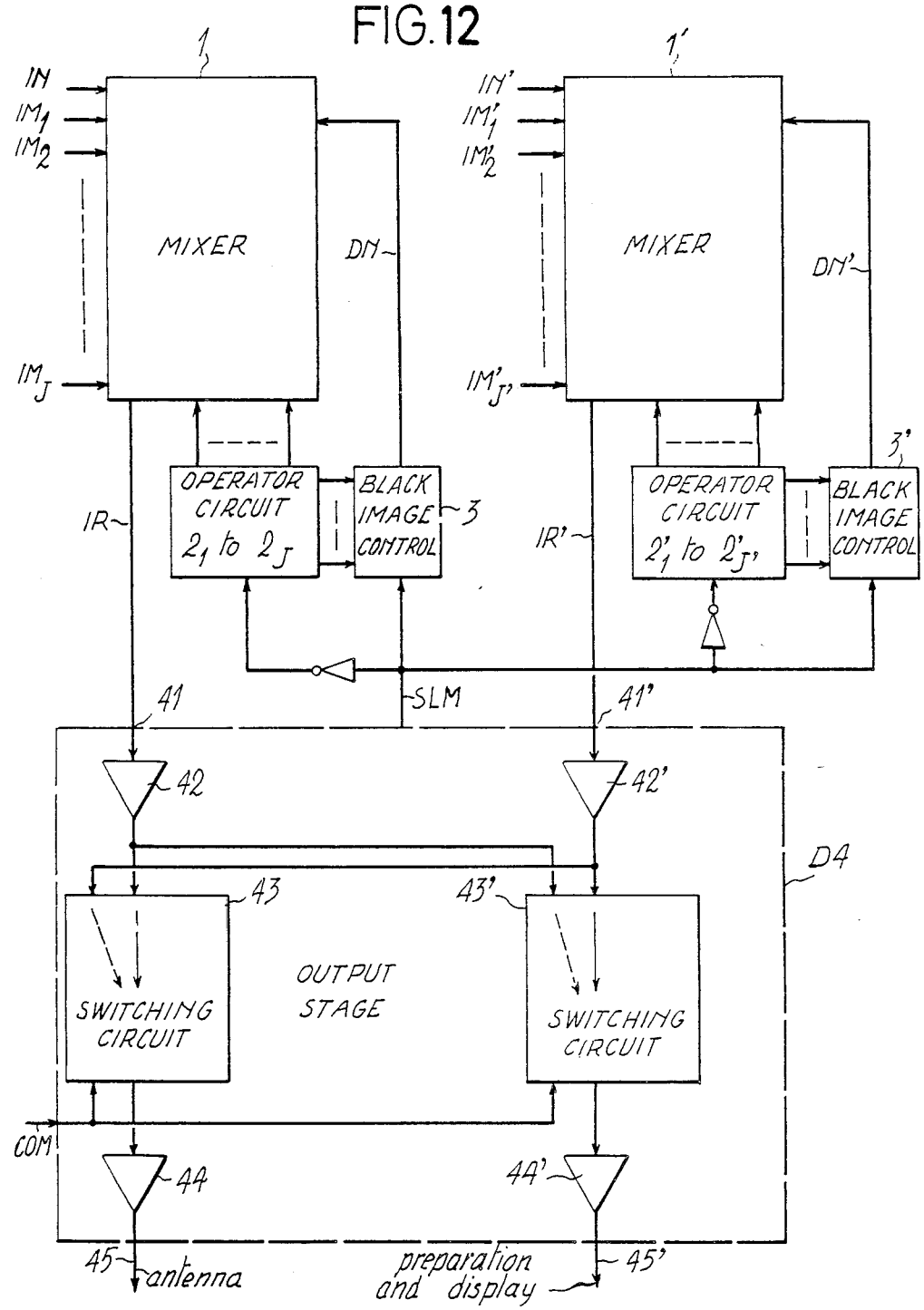

VIDEO SIGNAL MIXER DEVICE

BACKGROUND OF THE INVENTION

1. Field of the Invention

The present invention relates generally to combinations of video signals required in a TV production control room thereby notably obtaining special effects such as image inlayings and superimpositions and also cross fades and black fades.

2. Description of the Prior Art

As known, a television control room contains plural video sources transmitting synchronous video signals, in-phase and of the same nature or standard, so as to select certain of them, according to requirements, to create special effects visible in the image represented by the video signal resulting from the combination.

Image mixer devices in analog television at present have a basic architecture shown schematically in FIGS. 1 to 4 appended hereto. All these mixer devices contain a videofrequency signal switching grid GR receiving incoming video signals outgoing from the video sources for selecting, as required, a certain number of these signals to be combined in elementary mixers of "variable gain switch" type CGV.

According to the simple example shown in FIG. 1, the mixer device comprises one single elementary mixer CGV only. In the mixer CGV, two video signals IA and IB selected by the grid GR from the signals $IM_1$ to $IM_J$ are applied to two variable gain amplifiers or analog multipliers MA and MB also receiving two control signals CA and CB respectively. The two video signals modified by the control signals are then added in an adder AD into a resultant signal IR corresponding to the composite image to be broadcast.

The control signals CA and CB are produced in a control circuit CO, as from the selection of effect and dissolve signals available in the control room so as to obtain in the composite image one of the effects and dissolves required.

To create a composite image resulting from the combination of more than two images, the mixer device must contain several mixers CGV.

For example, as illustrated in FIGS. 2 and 3, the resultant signal IR is deduced from a combination of four incoming video signals IA, IB, IC and ID selected by the grid CR. According to FIG. 2, the mixer device comprises three mixers CGV1, CGV2 and CGV3 connected in cascade, i.e., the mixer CGV1 mixes signals IA and IB into a signal S1, the mixer CGV2 mixes signals S1 and IC into an signal S2, and mixer CGV3 mixes signals S2 and ID into a signal S3=IR. In the mixer device shown in FIG. 3, mixers CGV1 and CGV2 respectively mix the signals IA and IB and the signals IC and ID into signals S1 and S2' which are mixed into a signal S3'=IR in a third CGV3 mixer.

Referring to FIG. 4, the mixer device also includes three mixers CGV1, CGV2 and CGV3 and an auxiliary switch grid GRA whereby the four signals IA, IB, IC and ID can be combined, like in the mixer devices shown in FIGS. 2 and 3, but also whereby certain of these four signals can be combined with other incoming video signals IE, IF and IG selected by the grid GR.

The resultant image in a mixer device is thus designed as a superimposition of several images circumscribed by predetermined contours and contained in superposed planes. FIG. 5 shows an image arrangement resulting from the superimposition of four image planes P1 to P4 designed to inlay a title, a person, a second background and a first background transmitted by video sources selected by the grid GR.

In mixer devices according to the prior art the contour of the resultant image outgoing from a mixer CGV is determined by an effect signal, and the appearance and vanishing of the resultant image are determined by the selected dissolve. The image inside the contour is supplied by the selected video source connected to one of the two inputs of the mixer and the image outside the contour is supplied by the selected video source connected to the other input of the mixer. To compose an image from several images contained in different contours, reflection through plane superposition is not immediate. Such a composition requires at least a switching grid GR which has a wide band of approximately 6 MHz and, therefore which is costly, and requires combinations of elementary mixers CGV which introduce different propagation times for the various selected dissolves of the video signals, and subsequently, phase-shifts between these signals on output from the mixer device are reflected in the resultant image.

Moreover, the pairs of control signals CA and CB in the mixers are independent from each other. Aware that the incoming video signals, but also the resultant video signal are normalized, i.e., have amplitudes lying between predetermined limits, the amplitude of the resultant signal risks overstepping the predetermined limits and must thus be clipped which causes defects in the resultant image. The result is that the surimposition of image planes imposes a sum of incoming signals having crossed through the mixers CGV, lying in the predetermined limits so as to prevent any clipping of the resultant signal: for example, for several effects, the control signals should be subjected to complementarity conditions, so as to avoid an black or white underlining on the chopped and dissolved images.

OBJECTS THE INVENTION

The main object of this invention is to provide a mixer device, similar to an elementary mixer defined above, but having at least as many inputs as there are video sources, and not containing any video signal switch grid.

Another object of this invention is to eliminate all differences in the video signal transit times through a mixer device.

A further object of this invention is to remedy all complementarity defects between transitions of control signals, hereinafter referred to as "chopping signals", in a mixer device for mixing video signals.

SUMMARY OF THE INVENTION

Accordingly, in a device for mixing plural incoming video signals into a resultant video signal, the incoming video signals represent incoming images respectively, and the resulting video signal represents an image resulting from the superimposition of the incoming images. Plural means derive analog image chopping signals having amplitudes varying between predetermined low and high levels. The sum of the chopping signal amplitudes is less than said high level. Switching means selectively associates the chopping signals with the incoming signals. Plural means receiving respectively the incoming signals and having a common output terminal attenuate the incoming signals respectively by attenuation factors as a function of the associated chopping signals thereby transmitting the resultant signal via the common output terminal, the sum of the attenuation factors being equal to the unity.

According to the invention, the incoming video signals are applied directly, without crossing through a wide band switching grid, to the inputs of the attenuation means respectively. The allocation of image choppings prepared in the deriving means to the incoming video signals is performed via the switching means which is formed by a switching grid having relatively low band width, of about 1.5 MHz required to transmit the chopping signals.

According to another feature of this invention, the attenuating means comprise variable resistance circuits, such as field effect type transistors, having inputs receiving respectively the incoming video signals and outputs connected to the common output terminal transmitting the resultant signal. The variable resistance circuits are voltage controlled respectively by the associated chopping signals.

Thereby obtaining complementarity of the chopping signals between the high and low levels, whatever the dissolves and effects selected and the number of superimposed images, each of the deriving means comprises an analog inverter-summator for producing a complementary signal at the high level of the sum of chopping signals which are designed to chop incoming images in planes superimposed above a plane of the image chopped by the chopping signal derived by said deriving means, and means receiving an analog effect signal clipped to the high level and the complementary signal of the chopping signal sum for producing the chopping signal having an amplitude substantially equal to the lowest amplitude of the analog effect signal and the complementary signal.

The mixer device also introduces reference and synchronization signals into the resultant signal, such as those encountered in conventional video signals according to one of the PAL and NTSC standards, or in recent MAC type video signals. This introduction is obtained by means of a black image video signal also applied to a given input of the mixer device. The black image signal is also used to obtain image black fades, i.e., black cross fades enabling the use of one single potentiometer to perform cross fades and black fades. Thus according to a preferred embodiment of the invention, each of the chopping signal deriving means comprises means activated by a black fade control signal and receiving a black dissolve signal for supplying a black level control signal that varies complementarily to a predetermined plane chopping signal relatively to the black dissolve signal and that forms the chopping signal to be derived. For this embodiment, the mixer device comprises means for adding the black level control signals supplied by the deriving means into a black image control signal, and means receiving an incoming video signal representing a black image, connected to the common output terminal and similar to the other attenuating means for attenuating the black image representing signal as a function of the black image control signal.

BRIEF DESCRIPTION OF THE DRAWING

Other objects and features of this invention will become apparent from the following more particular description of preferred embodiments of the invention as illustrated in the appended corresponding drawings in which:

FIG. 5 is a graph showing superposed image planes already commented on;

FIG. 12 is a schematic block diagram of another embodiment of a mixer device designed to switch two resultant video signals to be transmitted to an antenna and display means located in a control room;

DESCRIPTION OF THE PREFERRED EMBODIMENTS

Figure 1:
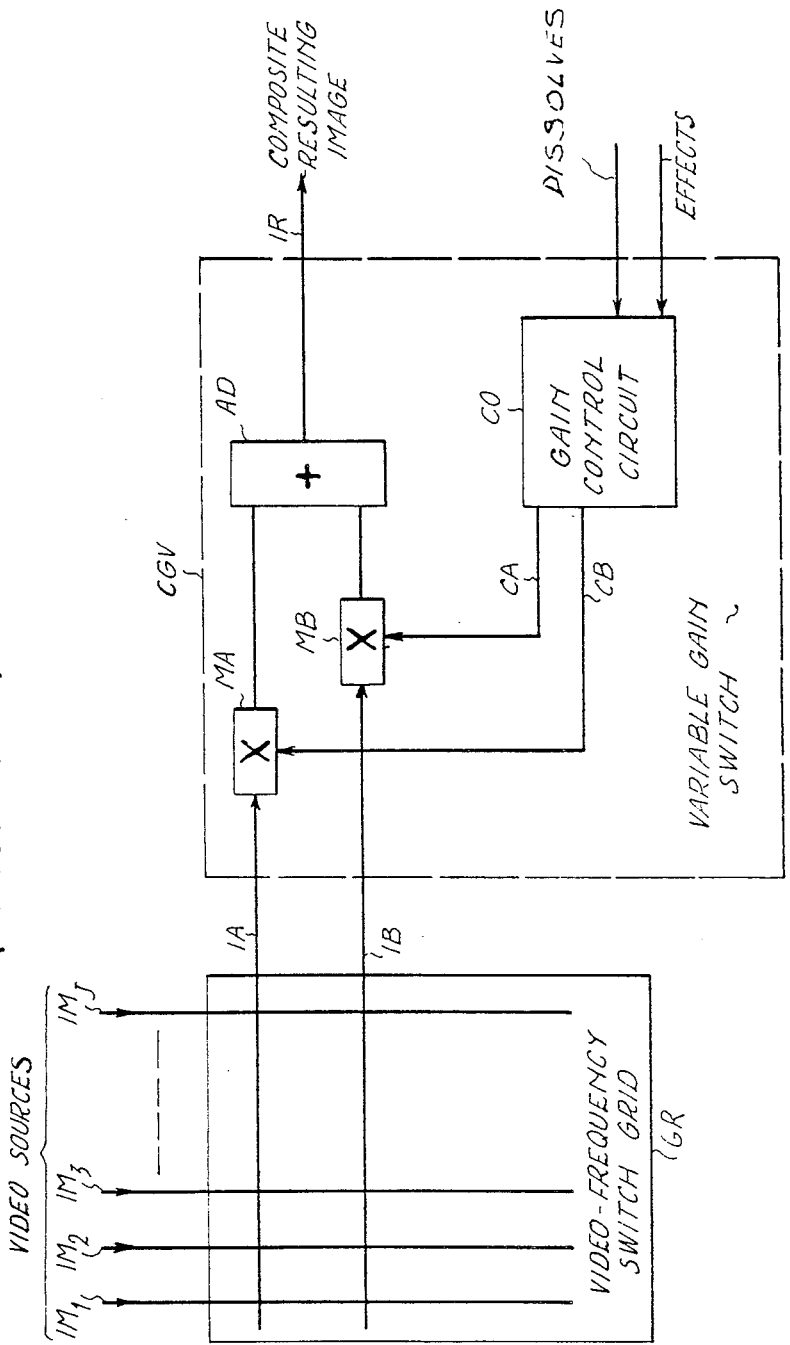
FIGS. 1, 2, 3 and 4 are schematic block diagrams of the mixer devices according to the prior art, commented on previously.
Figure 2:
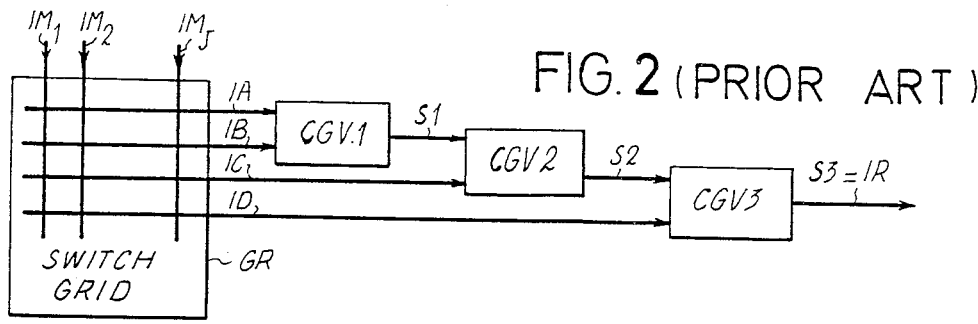
Figure 3:
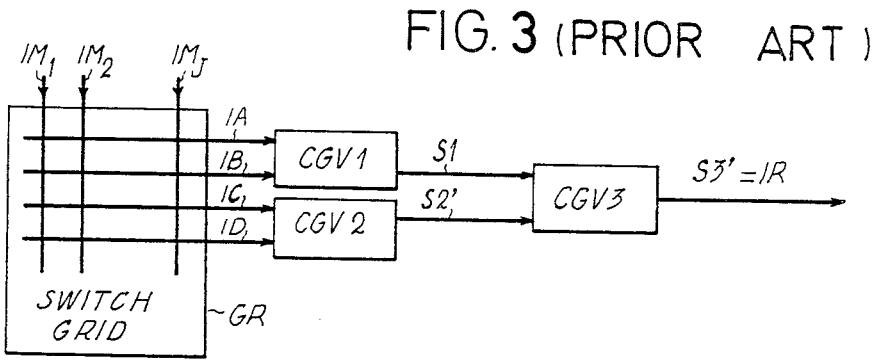
Figure 4:
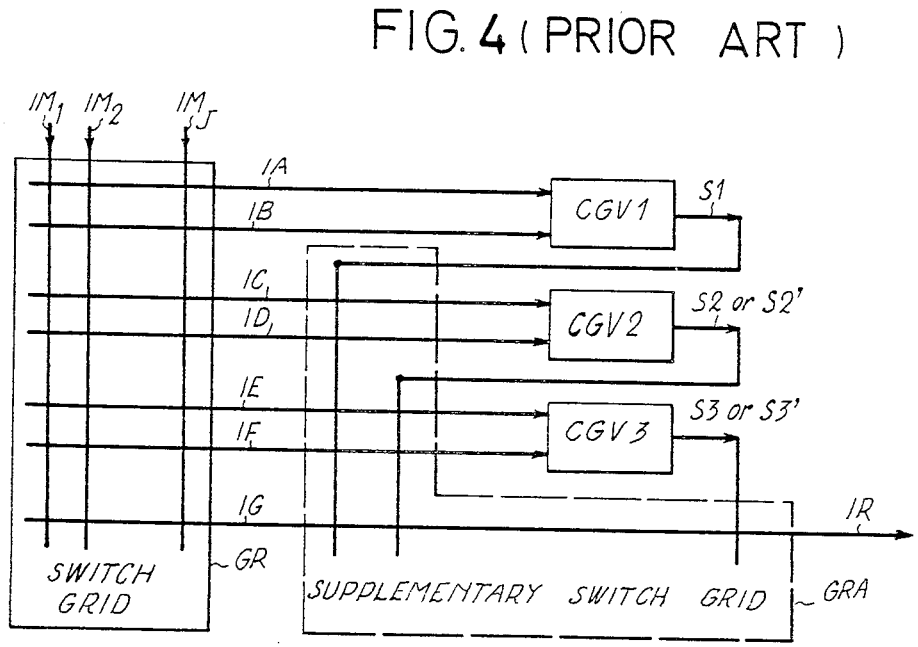
Figure 5:
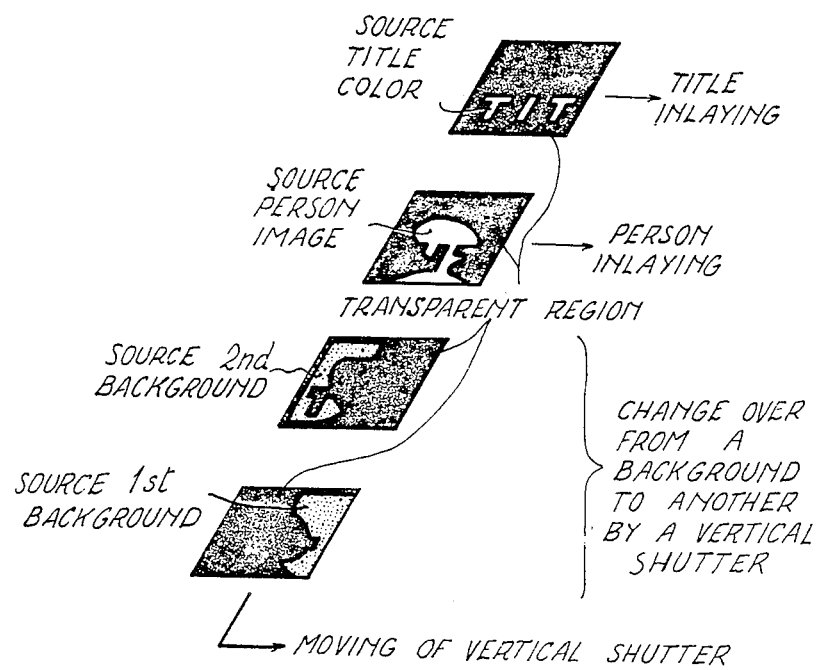
Figure 6:
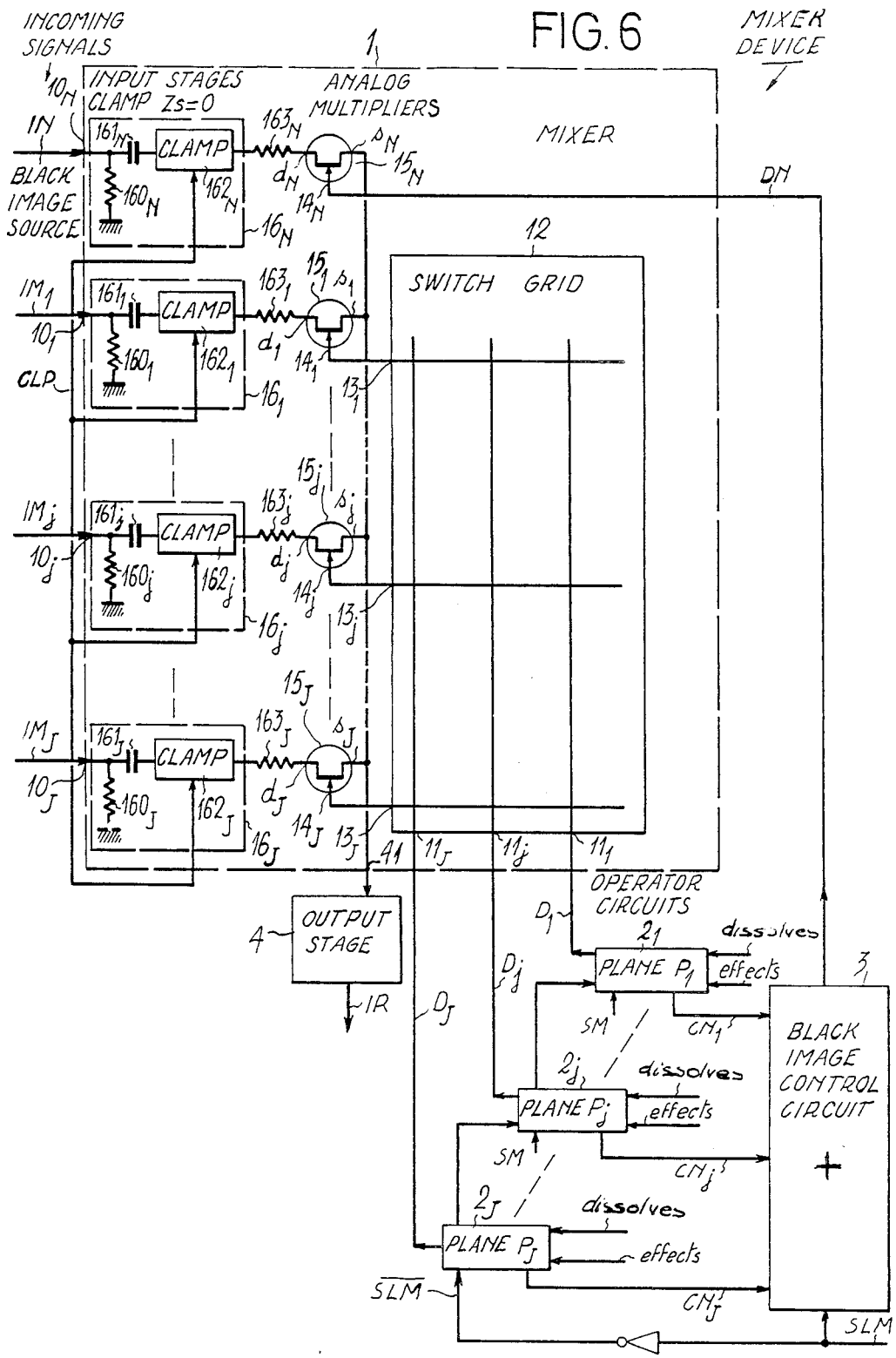
FIG. 6 is a schematic block diagram of a mixer device that mixes encoded video signals, according to the invention.

Referring to FIG. 6, a mixer device embodying the invention receives J color television image signals $IM_1$ to $IM_J$ via video input terminals $10_1$ to $10_J$ of a mixer 1, where J is an integer. Mixer 1 also receives a black image signal IN via a video input terminal $10_N$. Subsequently, it is assumed that the image signals are of the same nature and can be for example video signals encoded according to a known television standard; different applications relating to different incoming video signals in mixer 1 are envisaged after the present detailed description of the mixer device. The image signals have a standardized peak-to-peak amplitude varying between 0 and 1 Volt. Insofar as concerns at least the active portions of the image signals carrying an image, the amplitude varies between a voltage of 0.3 V defining a transparent or black image and a voltage of $V_{max}=1$ V defining a white image. The image signals can be supplied by synchronous and phased-in video sources such as video cameras, video tape recorders and other apparatuses used in a TV studio production control room.

Apart from the mixer 1, the mixer device includes J operator circuits $2_1$ to $2_J$ for deriving so-called image plane chopping signals $D_1$ to $D_J$ and black level control signals $CN_1$ to $CN_J$, a black image control circuit 3, and an output stage 4 delivering a resultant image signal IR.

Each operator circuit $2_1$ to $2_J$ notably receives effect signals and dissolve (or mix) control signals so as to combine them into a respective chopping signal $D_1$ to $D_J$ defining a "contour" and image modifications in an image plane $P_1$ to $P_J$ associated to one of the incoming image signals $IM_1$ to $IM_J$. Thus the mixing of the $IM_1$ to $IM_J$ image signals results from the superimposition of J image planes $P_1$ to $P_J$, where $P_1$ is the first upper plane and $P_J$ the last lower plane, so as to produce a resultant image. During the line and field blanking intervals indicated by state "1" of a logic signal SLM, all the image planes are made transparent, and the resultant image signal is composed only of the black image signal IN.

The mixer 1, the chopping signals $D_1$ to $D_J$ derived from the operator circuits are applied to J column inputs $11_1$ to $11_J$ of a switch grid or matrix 12 having $13_1$ to $13_J$ row outputs connected to control inputs $14_1$ to $14_J$ of analog multipliers $15_1$ to $15_J$ practically equivalent to amplifiers having a variable gain less than or equal to the unity. Multipliers $15_1$ to $15_J$ receive the incoming image signals $IM_1$ to $IM_J$ through input stages $16_1$ to $16_J$ and have output terminals connected to an input terminal 41 of output stage 4.

Switch grid 12 enables "mixing" of the image contours prepared by the operator circuits $2_1$ to $2_J$. Grid 12 has in practice a lower performance than a videofrequency signal switching grid. In fact the chopping signals $D_1$ to $D_J$ have a lower pass-band having a typical width of about 1.5 MHz, instead of a minimum of 6 MHz for a video grid. Moreover the chopping signals are less sensitive to crosstalk phenomena, typically of $-26$ dB instead of $-50$ dB, this being due to the fact that the chopping signals $D_1$ to $D_J$ are inactive beyond 0 and 1 V. Switch grid 12 is thus easier to produce and far less costly. In practice switch grid 12 is obtained by packages each having four AD 7590 type locked control switches sold by the American firm ANALOG DEVICE. The switching is managed by a simple microprocessor, such as the 8748 microprocessor sold by the American firm INTEL, associated to 8243 type input/output interfaces. The number of operator circuits is at least equal to the maximum number J of image planes to be superimposed in order to obtain a resultant image and, in practice, can be equal to or less than the number of sources transmitting the incoming image signals to be mixed. An operator circuit can control chopping of one of the image signals by means of suitable crosspoint selections in grid 12. It is assumed hereafter that the chopping signals $D_1$ to $D_J$ are selectively associated to incoming signals $IM_1$ to $IM_J$ by switch grid 12.

The chopping signals have amplitude varying between a low level fixed at 0 V and a high level fixed at 1 V so that an analog multiplier operates as an amplifier having a variable gain between 0 and 1. Likewise socalled effect, dissolve, shade, and spot effect signals which are applied to operator circuit $2_1$ to $2_J$ and combined in them, are analog signals preferably with amplitudes of between 0 and 1 V, or clipped between these limit voltages.

As shown schematically in FIG. 6, each analog multiplier $15_1$ to $15_J$ contains a variable resistor which varies depending on the amplitude of the chopping control signal applied to its input $14_1$ to $14_J$ and selected by switch grid 12 from amongst the chopping signals. According to the invention, a variable resistor consists of a drain-source resistance in a field effect transistor. The transistor has a gate connected to terminal $14_1$ to $14_J$, a drain $d_1$ to $d_J$ connected to input terminal $10_1$ to $10_J$ via input stage $16_1$ to $16_J$, and a source $s_1$ to $s_J$ connected to input terminal 41 of output stage 4. All other variable resistance components can be also used.

In practice, input stages $16_1$ to $16_J$ and analog multipliers $15_1$ to $15_J$ are hybrid integrated circuits V 315 and V 316 marketed by the French firm ALCATEL, and the output stage 4 consists of an operational amplifier operating as impedance matching circuit.

Input stage $16_1$ to $16_J$ has an input resistor $160_1$ to $160_J$ having a resistance equal to the characteristic impedance of a cable connecting the corresponding video source delivering the image signal $IM_1$ to $IM_J$ to input terminal $10_1$ to $10_J$, typical impedance of 75 ohms. Input stage $16_1$ to $16_J$ basically includes a black level clamping circuit $162_1$ to $161_J$ which is uncoupled from the input terminal by a link capacitor $161_1$ to $161_J$ for d.c. voltages, and which clamps the black level of the image signal $IM_1$ to $IM_J$ to the ground reference voltage by means of clamp pulses CLP. The pulses CLP are supplied by well known circuits used in a television control room, also delivering various synchronous signals required for the mixer device and notably for the operator circuits $2_1$ to $2_J$. On output, the input stage offers a very low output impedance, less than 20 ohms, so as to apply to output stage 4, via a series resistor $163_1$ and the associated analog multiplier $15_1$ to $15_J$, the image signal $IM_1$ to $IM_J$ having been attenuated depending on the corresponding chopping and control signal. Resistors $163_1$ to $163_J$ homogenize various output resistances in the input stages and have a typically resistance of 47 ohms.

Each multiplier $15_1$ to $15_J$ is analogous to an analog switch-mixer with variable commutation speed described in French patent No. 2,484,109 in which a single field effect transistor is involved.

Output stage 4 offers a very high input impedance and an output impedance of 75 ohms of a cable carrying the resultant image signal IR. In practice, the output stage contains a very wide-band operational amplifier. The task of this operational amplifier is to correct the amplitude—frequency characteristic of the resultant signal outgoing from the mixer.

Figure 7:
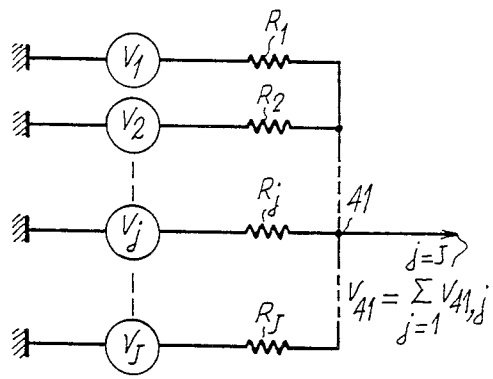
FIG. 7 shows a circuit equivalent to video and chopping signal analog multipliers included in the mixer device.

Referring to FIG. 7 showing an equivalent circuit of mixer 1, in which voltage sources $V_1$ to $V_J$ represent input stages $16_1$ to $16_J$, and resistors $R_1$ to $R_J$ represent the drain-source resistances of the field effect transistors in multipliers $15_1$ to $15_J$, the following conductances and resistances are defined, where j is an integer index between 1 and $G_1 = 1/R_1; \ldots G_j = 1/R_j; \ldots G_J = 1/R_J$ $G_{41} = G_1 + \ldots + G_j + \ldots + G_J =$ conductance seen from input terminal 41 of the output stage;

$R'_j =$ resistance equivalent to the J-1 parallel resistances $R_1, \ldots R_{j-1}, R_{j+1}, \ldots R_J$; and $G'_j = 1/R'_j$, whence $G_{41} = G'_j + G_j$.

The voltage on terminal 41 indicated by $V_j$ is:

$$V_{41,j} = V_j \cdot R'_j / (R_j + R'_j)$$

According to the definitions above, the denominator of the above equation can be replaced by:

$$R_j + R'_j = 1/G_j + 1/G'_j = (G_j + G'_j)/(G_j \cdot G'_j)$$

or ps
$$R_j + R'_j = G_{41}/(G_j \cdot G'_j)$$

i.e.

$$V_{41,j} = V_j \cdot G_j / G_{41}$$

Likewise for j varying from 1 to J, I obtain:

$$V_{41,1} = V_1 \cdot G_1 / G_{41}$$

$$V_{41,2} + V_2 \cdot G_2 / G_{41}$$

$$V_{41,J} = V_J \cdot G_J / G_{41}$$

Applying the principle of voltage superposition, the signal $V_{41}$ on terminal 41 is:

$$V_{41} = (V_1 \cdot G_1 + V_2 \cdot G_2 + \ldots V_j \cdot G_j + \ldots V_J \cdot G_J)/G_{41}$$

As already stated, the image signals have a maximum amplitude $V_{max}$. The maximum voltage on terminal 41 is then:

$$VMAX_{41} = V_{max}(G_1 + G_2 + \ldots G_j + \ldots G_J)/G_{41}$$

i.e., $$VMAX_{41} = V_{max}.$$

The result is that, whatever the amplitudes $V_1$ to $V_J$ of the image signals, the resultant signal IR also has a standard amplitude included within the same limits as that of the image signals to be mixed even if the complementarity of the chopping signals with the high level "1" is not ensured. In other words, whatever the levels of the multiplier control signals and hence of chopping signals $D_1$ to $D_J$ and consequently proportions of the component images $IM_1$ to $IM_J$ in the resultant image IR, the resultant image signal does not require to be clipped which does not denature the mixed images.

Figure 8:
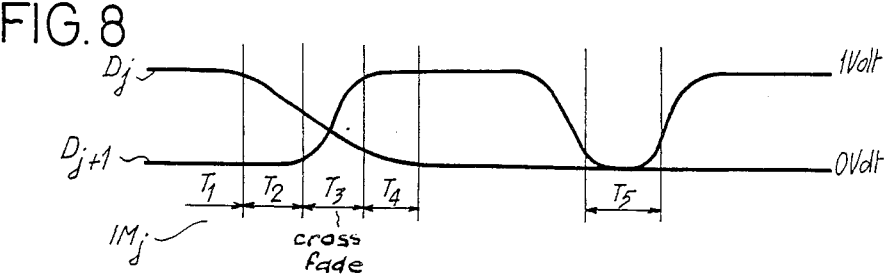
FIG. 8 is a waveform diagram illustrating two chopping signals.

In order to settle matters, FIG. 8 illustrates various amplitude combinations, especially noncomplementary, of two chopping signals $D_j$ to $D_{j+1}$ designed to mix for example two incoming image signals $IM_j$ and $IM_{j+1}$. In a time interval $T_1$, the signals $D_j$ and $D_{j+1}$ are respectively at high level to 1 V and at low blocking level to 0 V, and subsequently the resultant image is only composed of the first image $IM_j$. In a time interval $T_2$, the signal $D_{j+1}$ is to 0 V and the $D_j$ decreases from 1 V; the attenuated image signal $IM_j$ alone crosses mixer 1, the plane $P_{j+1}$ of the image $IM_{j+1}$ being transparent. In a time interval $T_3$, the signal $D_j$ continues to decrease to low level which corresponds to resistance increase in the resistor $R_j$ of the associated multiplier $15_j$, whereas the signal $D_{j+1}$ increases from the low level to the high level which corresponds to a resistance reduction in the resistor $R_{j+1}$; with these variations it is possible to obtain a cross fade so as to substitute image $IM_{j+1}$ for image $IM_j$ in the resultant image. In a time interval $T_4$, signals $D_j$ and $D_{j+1}$ respectively reach the low and high levels, as opposed to the mixture in interval $T_1$, so as to terminate the cross fade in interval $T_3$. In a time interval $T_5$, signal $D_j$ is at low level, whereas signal $D_j$ decreases to low level and then increases from the low level; for this combination no image $IM_j$, $IM_{j+1}$ is correctly transmitted given that the transistor resistances in multipliers $15_j$ and $15_{j+1}$ tend toward the infinite. For all above combinations, the sum of the attenuations $\alpha_j = R_{j+1}/(R_j + R_{j+1})$ of signal $IM_j$ and $\alpha_{j+1} = R_j/(R_j + R_{j+1})$ is equal to 1.

It should be observed that, when the field effect transistors in analog multipliers $15_1$ to $15_J$ are turned off, i.e., when all the image planes $P_1$ to $P_J$ are transparent, mixer 1 restores the black image signal IN to terminal 41. In this case, and also during the line and field blanking intervals of a video signal defined by the signal SLM as will be seen later, the black image control circuit 3 applies a signal DN to a control input $14_N$ of an analog multiplier $15_N$ included in mixer 1. As shown in FIG. 6, the black image input $10_N$ is connected to the input terminal 41 of output stage 4 via an input stage $16_N$ and multiplier $15_N$ which are respectively identical to stages $16_1$ to $16_J$ and to multipliers $15_1$ to $15_J$ described previously. Thus, if no image $IM_1$ to $IM_J$ is transmitted, the black image signal IN is alone applied to terminal 41.

One, $2_j$, of the operator circuits $2_1$ to $2_J$ which are all identical, is now described. Operator circuit $2_j$ includes elementary analog circuits shown in FIGS. 9A to 9G in order to derive the black level control signal $CN_j$ depending on various effect, dissolve, shade and spot effect signals, and control or key signals selecting the above signals, and also depending on the signals $CN_1$ to $CN_{j-1}$ and $D_1$ to $D_{j-1}$ derived by the operator circuits $2_1$ to $2_{j-1}$ corresponding to the upper image planes $P_1$ to $P_{j-1}$ superimposed above image plane $P_j$. All the various aforesaid signals received and derived by the operator circuit are analog signals having amplitudes normally lying between the low level to 0 V and the high level to 1 V. Moreover it is noticed that the elementary circuits detailed in FIGS. 9A to 9G are associated to symbolic representations which are shown in FIG. 10 providing a detailed block diagram of operator circuit $2_j$. In FIGS. 9A to 9G, $+Vcc$ and $-Vcc$ designate supply voltages which are typically $+12$ V et $-12$ V.

Figure 9A:
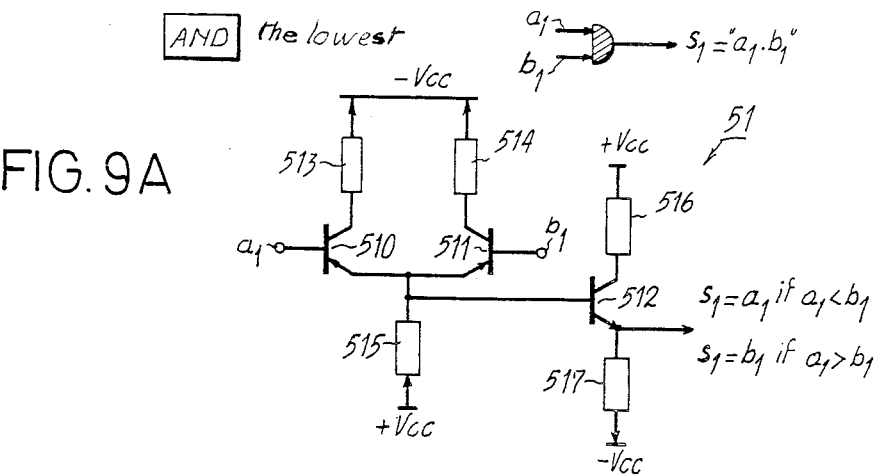
FIGS. 9A to 9G show in detail various elementary analog circuits used in operator circuits included in the mixer device.
Figure 10:
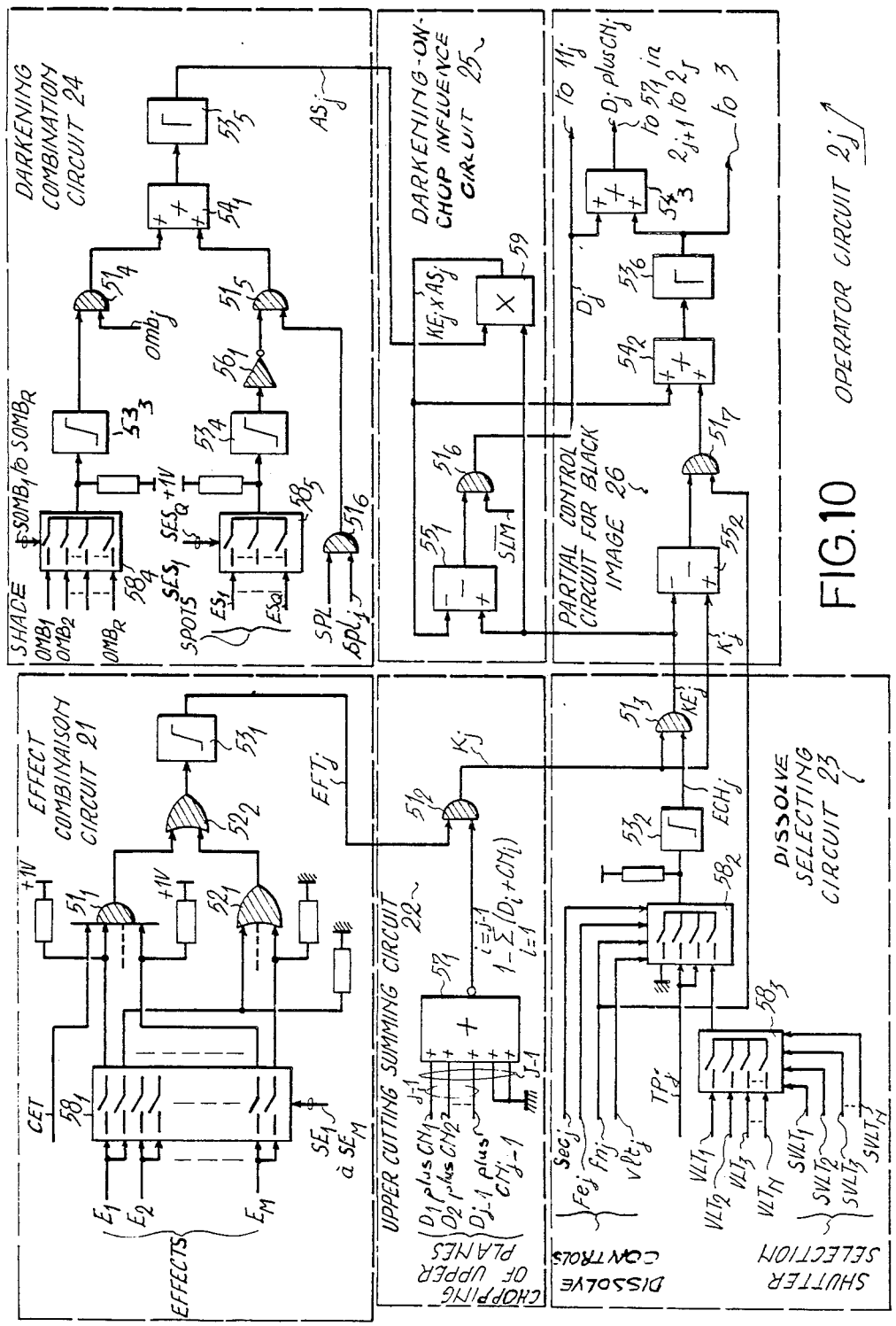
FIG. 10 is a detailed block diagram of an operator circuit.

As shown in FIG. 9A, a circuit 51 for selecting a signal having the lowest amplitude amongst two incoming analog signals $a_1$ and $b_1$ comprises two input transistors 510 and 511 and an output transistor 512. Transistors 510 and 511 are bipolar pnp transistors having bases receiving signals $a_1$ and $b_1$, collectors polarized to $-Vcc$ via equal resistors 513 and 514, and coupled emitters polarized to $+Vcc$ through a resistor 515. The output transistor 512 is a bipolar npn transistor having a base connected to the emitters of transistors 510 and 511, a collector polarized to $+Vcc$ directly or through a resistor 516, and an emitter forming the output of circuit 51, and polarized to $-Vcc$ via a resistor 517. The emitter of transistor 512 delivers an outgoing signal $s_1$ so that:

$s_1 = a_1$ when $a_1 < b_1$, and $s_1 = b_1$ when $a_1 > b_1$

For these reasons circuit 51 is symbolized by an "analog AND gate" delivering a signal $s_1 = "a_1.b_1"$.

Figure 9B:
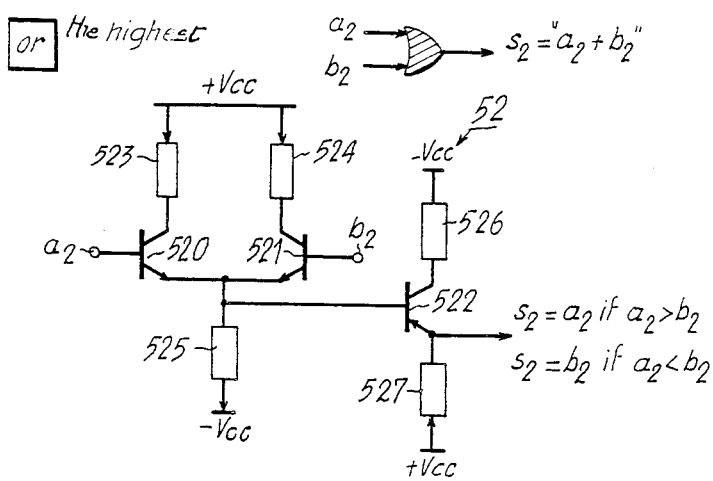

A circuit 52 performing an operation reciprocal to that of circuit 51 is shown in FIG. 9B. Circuit 52 selects a signal having the highest amplitude amongst two incoming analog signals $a_2$ and $b_2$ thereby delivering an outgoing signal $s_2$ such that:

$s_2 = a_2$ when $a_2 > b_2$, and $s_2 = b_2$ when $a_2 < b_2$

Circuit 52 is thus symbolized by an "analog OR gate" delivering a signal $s_2 = "a_2 + b_2"$. Circuit 52 contains two input transistors 520 and 521, an output transistor 522, and resistors 523 to 527 arranged in the same way as the analogous components 510 to 517 in circuit 51. Nevertheless transistors 520 and 521 are bipolar npn transistors having collectors and emitters polarized to $+Vcc$ and $-Vcc$, and transistor 522 is a bipolar pnp transistor having collector and emitter polarized to $-Vcc$ and $+Vcc$ respectively.

When an AND circuit, respectively an OR circuit has M inputs receiving respectively M incoming signals, it includes M input transistors having emitters coupled to the base of the output transistor whose emitter delivers, as outgoing signal, the incoming signal having the lowest, respectively highest amplitude.

Figure 9C:
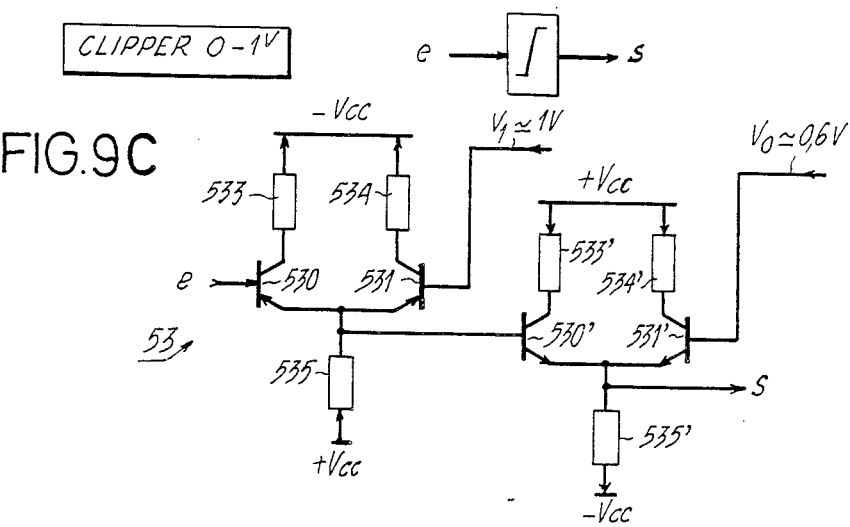

A clipper 53 for clipping an incoming signal e between the low level to 0 V and the high level to 1 V is shown in FIG. 9C. The clipper is a combination of an AND circuit and an OR circuit in cascade, or in other words, of a first clipper at a high level and a second clipper at a low level, so that the AND circuit forming the first clipper selects the lowest amplitude between those of the incoming signal e and an incoming d.c. signal $V_1 = 1$ V, and that the OR circuit forming the second clipper selects the highest amplitude between those of a signal outgoing from the AND circuit and an incoming d.c. signal of low level, typically to $V_0 = 0.6$ V $< V_1$, thus enabling an outgoing signal s to be delivered with an amplitude lying between 0 and 1 V. According to the embodiment illustrated in FIG. 9C, clipper 53 comprises two transistors 530 and 531 and three resistors 533, 534 and 535 arranged in the same way as components 510, 511, 513, 514 and 515 in the AND circuit 51, and two transistors 530' and 531' and three resistors 533', 534' and 535' arranged in the same way as components 520, 521, 523, 524 and 525 in the OR circuit 52. The bases of transistors 530 and 531 receive the signals e and $V_1$ respectively. The bases of transistors 530' and 531' receive the signals supplied by the coupled emitters of transistors 530 and 531, and the $V_0$ signal respectively. The coupled emitters of transistors 530' and 531' deliver the outgoing signal s.

Figure 9D:
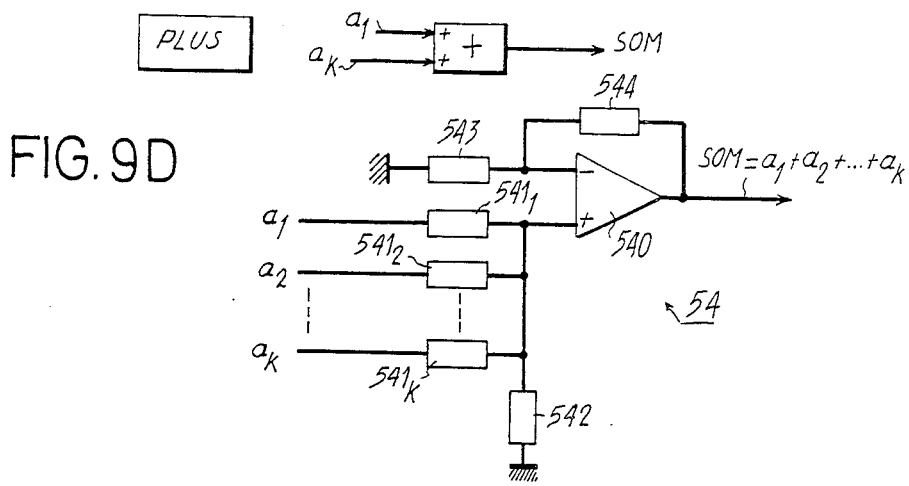

An analog adder 54 is shown in FIG. 9D. Adder 54 conventionally includes an operational amplifier 540 having a direct input (+) connected to input resistors $541_1$ to $541_K$ receiving K incoming signals $a_1$ to $a_K$, and connected to a grounded resistor 542. A reverse input (−) of amplifier 540 is connected to a grounded resistance 543 and a feedback resistor 544. Resistor 544 has a terminal connected to an output of amplifier 540 delivering a sum signal $SOM = a_1 + a_2 + \ldots + a_K$.

Figure 9E:
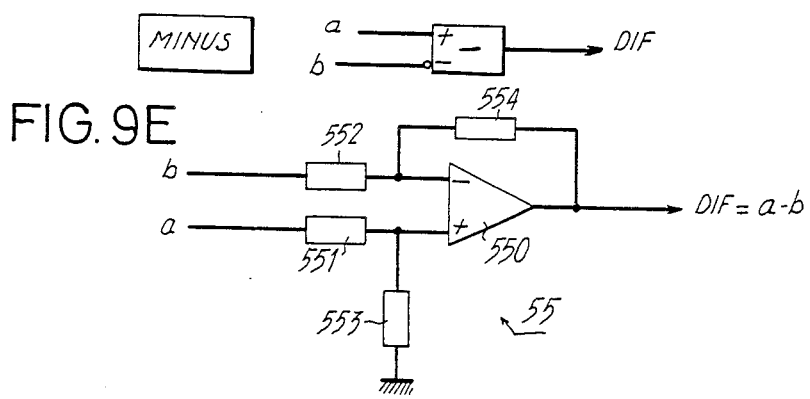

As shown in FIG. 9E, an analog subtractor 55 for deriving a difference signal $DIF = a-b$ from two incoming signals a and b conventionally includes an operational amplifier 550 having direct (+) and reverse (−) inputs connected to input resistors 551 and 552 receiving the signals a and b respectively. The direct input (+) is grounded via a resistor 553. The reverse input (+) is connected, via a feedback resistor 554, to the output of amplifier 550 providing the difference signal DIF.

Figure 9F:
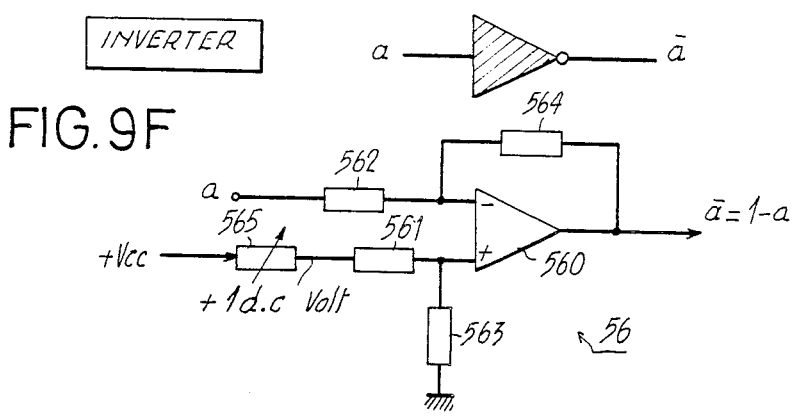

As shown in FIG. 9F, an analog inverter 56 is obtained as from subtractor 55 and delivers a signal "$\bar{a}$" = 1-a complementary to 1 V from an incoming signal a. Inverter 56 includes components 560 to 564 respectively analogous to components 550 to 554 and arranged in the same way. The reverse input (−) of amplifier 560 receives the signal a through input resistor 562. The direct input (+) of amplifier 560 is biased to d.c. voltage to 1 V via input resistor 561, this d.c. voltage being obtained from the +Vcc voltage through a potentiometer 565.

Figure 9G:
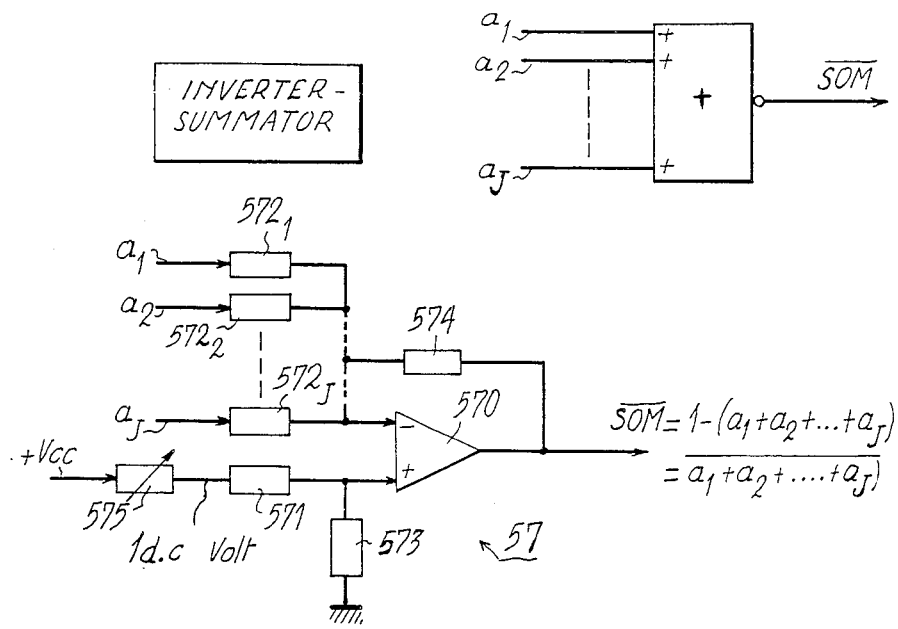

As shown in FIG. 9G, from inverter 56 is deduced an inverter-summator 57 delivering a sum signal $\overline{SOM} = \overline{a_1 + a_2 + \ldots + a_J} = 1-(a_1 + a_2 + \ldots + a_J)$ complementary to 1 V, as from J incoming signals $a_1$ to $a_J$. The inverter-summator 57 includes components 570, 571, 573, 574 and 575 respectively analogous to components 561, 562, 563, 564 and 565 in inverter 56 and arranged in the same way. Input resistors $572_1$ to $572_J$ replace resistor 562, and are connected to the reverse input (−) of amplifier 570 and receive incoming signals $a_1$ to $a_J$.

Now referring to FIG. 10, operator circuit $2_j$ comprises an effect combination circuit 21, an upper chop summing circuit 22, and a dissolve selecting circuit 23, a darkening combination circuit 24, a darkening-on-chop influence circuit 25, and a black image partial control circuit 26.

The effect combination circuit 21 receives M analog color TV special effect signals $E_1$ to $E_M$. The effect signals are provided from effect electronic generators, such as well known TV image inlay systems and image over-impression systems. An effect is designed, for example, to inlay a foreground image, such as a person, into a background image, such a decor, or to inlay an insert or title into an image, or to combine by over-impression a substantially transparent image, such as a ghost or curtain of rain, on another image, such as a stage. The effect signals $E_1$ to $E_M$ are selected by effect selection logic signals $SE_1$ to $SE_M$ in a double switching circuit or double myltiplexer $58_1$. According to the embodiment illustrated, two combinations of effect selected signals are obtained by a M-input AND circuit $51_1$ and by a M-input OR circuit $52_1$, although other combinations can be envisaged. M input pairs in circuits $51_1$ and $52_1$ are connected to M output pair of circuit $58_1$, an a control terminal of AND circuit $51_1$ receives a control signal CET. Outputs of circuits $51_1$ and $52_2$ are connected, through a two-input OR circuit $52_2$, to a two-level clipper $53_1$ having an output delivering a combined-effect signal $EFT_j$ having an amplitude between 0 and 1 V.

If no effect signal is selected in circuit $58_1$ to be combined in the OR circuit $52_1$, the output of circuit $52_1$ is to low level "0". If no effect signal is selected in circuit $58_1$ to be combined in the AND circuit $51_1$, the output of circuit $51_1$ is to high level "1". The level of the control signal CET thus selects the activations of circuits $51_1$ and $52_1$. If the AND circuit $51_1$ is alone operative, the signal CET is to level "1", and a selection of two identical effect combinations derived by circuits $51_1$ and $52_1$ is not authorized. If the OR circuit $52_1$ is alone operative, the signal CET is to level "0". If an image is to be obtained covering the whole of the image plane, i.e., a signal $EFT_j$ always different from 0 V, the control signal CET is at high level and any effect selection by the AND circuit $51_1$ via the circuit $58_1$ is inhibited.

The upper chop summing circuit 22 includes a (J-1)-input inverter-summator $57_1$ and a two-input AND circuit $51_2$. Circuit $51_2$ has an input connected to the output of clipper $53_1$ delivering the combined effect signal $EFT_j$ and an input connected to the output of the inverter-summator $57_j$.

Figure 11:
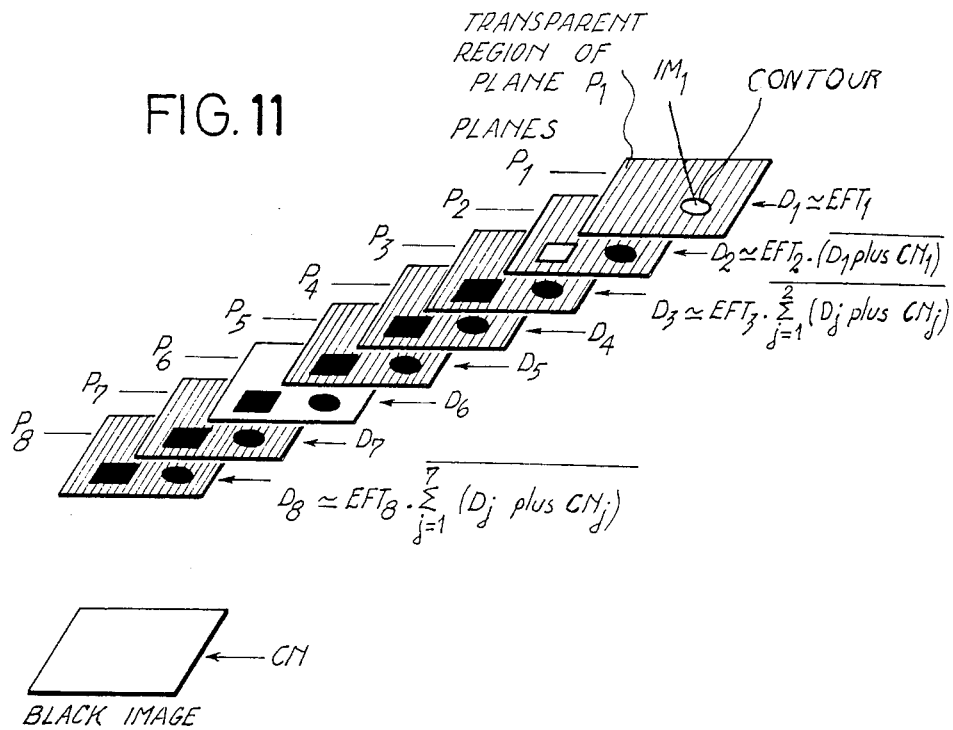
FIG. 11 is a graph showing superposed images chopped as a function of chopping signals derived by operator circuits.

For the operator circuit $2_j$, the chopping signal $D_j$ for the corresponding image plane $P_j$ must have an amplitude not exceeding the complement to 1 V of the sum of the signals $(D_1 + CN_1)$ to $(D_{j-1} + CN_{j-1})$ so that the resultant signal is always hold within the standard amplitude interval, without clipping. On these grounds, as illustrated schematically in FIG. 11 for J=8 image planes, the insertion of the image onto plane $P_j$ should take into account the proportion of images in the upper planes $P_1$ to $P_{j-1}$ relatively to the resultant image. Moreover, as will be seen subsequently, for each upper image plane, the black level control signal $CN_1$ to $CN_{j-1}$ which controls, via circuit 3 and multiplier $15_N$, the proportion of the black level in the resultant image during a black cross fade or a darkening, is taken into account.

Thus the inverter-summator $57_1$ receives via j-1 inputs the signals $D_1+CN_1$ to $D_{j-1}+CN_{j-1}$ so as to produce a signal $1-((D_1+CN_1) + \ldots +(D_{j-1}+CN_{j-1}))$. The (J-1)-(j-1) remaining inputs of inverter-summator $57_1$ in operator circuit $2_j$ are grounded, i.e., to 0 V; thus when j=1 for operator circuit $2_1$; all the inputs of the inverter-summator included in it are grounded. The AND circuit $51_2$ delivers a signal $K_j$ which is a chopping signal resulting from the combination of the effects selected in plane $P_j$ with dissolve and darkening and having an amplitude not exceeding the complement to 1 V available to insert images in the lower planes $P_j$ to $P_J$.

The dissolve selecting circuit 23 is designed to select in the image plane $P_j$ a known dissolve mode from out of four for example, via four logic dissolve control signals, also called keys, $sec_j$, $fe_j$, $fn_j$ and $vlt_j$. Each of these signals to state "1" controls the closing of a respective elementary switch out of four included in a switch or analog multiplexer $58_2$.

When $sec_j=1$, switch $58_2$ delivers a zero voltage so as to make transparent the portions of image plane $P_j$, i.e., to totally suppress these image portions thereby inserting images of lower planes into the resultant image. When $sec_j=0$, the signal $K_j$ is transmitted in full via an AND circuit $51_3$ having an input connected to the output of the AND circuit $51_2$, and another input connected to the output of switch $58_2$ via a two-level clipper $53_2$.

When $fe_j$ or $fn_j=1$, the switch $58_2$ delivers a signal $TP_j$ that has an amplitude varying typically between 0 and 1 V by means of a potentiometer. The signal $fe_j$ controls a cross fade between the image on plane $P_j$ and an image on another plane, and the signal $fn_j$ controls a black fade for the image on plane $P_j$.

When $vlt_j=1$, switch $58_2$ connects the output of a switch or analog multiplexer $58_3$ to the input of clipper $53_2$. Switch $58_3$ receives N shutter signals $VLT_1$ to $VLT_N$ selected respectively by N logic shutter selecting signals $SVLT_1$ to $SVLT_N$.

When all the dissolve control signals are to state "0", the output of switch $58_2$ delivers via clipper $53_2$ a dissolve signal $ECH_j$ with the high level of 1 V, and subsequently the output of the AND circuit $51_3$ supplies a signal $KE_j=K_j$. When the signal $ECH_j$ varies between 0 and 1 V as a result of a dissolve control, the signal $KE_J$ corresponds to a chopping of signal $K_j$ depending on the selected dissolve, before eventually darkening in plane $P_j$, whilst preserving the signal complementarity to 1 V for the image in plane $P_j$ in relation to the superposition of images in the upper planes $P_1$ to $P_{j-1}$ by means of the AND circuit $51_3$.

The darkening combination circuit 24 is designed, via a cross fade with the black image, to darken the image on plane $P_j$, stopping this fade at a level determined by one of R shade signals $OMB_1$ to $OMB_R$ having predetermined levels lying between 0 and 1 V. The shade signals $OMB_1$ to $OMB_R$ are selected in a switch or analog multiplexer $58_4$ by logic shade selecting signals $SOMB_1$ to $SOMB_R$ respectively. Signals $OMB_1$ to $OMB_R$ are for example supplied by image inlay systems. The selected shade signal is clipped on output from switch $58_4$ by a two-level clipper $53_3$ having an output connected to a first input of a two-input AND circuit $51_4$. A second input of the AND circuit $51_4$ receives a logic control signal $omb_j$ which, at state "0", inhibits transmission of the selected shade signal $OMB_1$ to $OMB_R$.

Circuit 24 also enables to partially darken the image on plane $P_j$ to form a luminous "spot" thereby, for example, preserving the illumination of a person and gradually darken the rest of the planes $P_j$ to $P_J$ around the person and representing a scene in which the person evolves. The luminous spot is obtained from one of Q spot effect signals $ES_1$ to $ES_Q$ selected respectively by logic spot effect selecting signals $SES_1$ to $SES_Q$ in a switch or analog multiplexer $58_5$. The selected spot effect signal $ES_1$ to $ES_Q$ on output from switch $58_5$ is clipped in a two-level clipper $53_4$ and reversed in an inverter $56_1$ to be applied onto a first input of a two-input AND circuit $51_5$. A second input of AND circuit $51_5$ is connected to a third two-input AND circuit $51_6$ included in the darkening combination circuit 24. The inputs of the AND circuit $51_6$ respectively receive a luminous spot signal SPL having a predetermined continuous level so as to clip the selected spot effect signal $ES_1$ to $ES_Q$ via the AND circuit $51_5$, and a control logic signal $sp1_j$ which, to state "1", triggers the selected spot effect and, to state "0", inhibits this spot effect.

In circuit 24, the selected shade signal $OMB_1$ to $OMB_R$ and the selected spot effect signal $ES_1$ to $ES_Q$ that is possibly clipped by the signal SPL, are added in an adder $54_1$ having two inputs connected to the outputs of the AND circuit $51_4$ and $51_5$ and an output connected to an input of a high level clipper $53_5$. Clipper $53_5$ clips at 1 V high level so as to ensure that a darkening signal $AS_j$ outgoing from it is less than 1 V. The signal $AS_j$ is applied to a first input of a known analog multiplication circuit 59 included in circuit 25.

The darkening of plane $P_j$ is reflected on all the lower planes $P_{j+1}$ to $P_J$, or in other words, the shade and spot effect signal selections are made identically in operator circuits $2_j$ to $2_J$.

The darkening-on-chop influence circuit 25 includes a subtractor $55_1$ having a direct input (+) connected to the output of the AND circuit $51_3$ and a reverse input (−) connected to an input of the analog multiplication circuit 59, an AND circuit $51_6$ having an input connected to an output of substractor $55_1$ and another input receiving an $\overline{SLM}$ signal, complementary to the logic signal SLM, marking line and field blanking intervals in the image signals, and the multiplication circuit 59 having a second input connected to the output of the AND circuit $51_3$.

Multiplication circuit 59 receives the darkening signal $AS_j$ together with signal $KE_j$ which indicates image chopping in plane $P_j$ subsequent to the selected and combined effects and dissolves. So as to settle matters, it is assumed for example that the image notably in plane $P_j$ is to be darkened in an intermediate shaded or blurred image region defined by $KE_j=0.2$ V, via a weak shade defined by a selected shade signal $OMB_1$ to $OMB_R$ such as $AS_j=0.3$ V. On output from circuit 59, a signal $KE_j \times AS_j=0.2\times0.3=0.06$ V represents the influence of the shade on the image chopping and is subtracted from chopping signal $KE_j$ in subtractor $55_1$. Then, through the AND circuit $51_6$, when the signal $\overline{SLM}$ is to state "0", the final chopping signal $D_j$ for the image plane $P_j$ is reset during the line and field blanking intervals. Signal $D_j$ outgoing from the AND circuit $51_6$ is thus transmitted from operator circuit $2_j$ to input $11_j$ of switch grid 12 in mixer 1.

The black image partial control circuit 26 includes a subtractor $55_2$, a two-input AND circuit $51_7$, a first two-input adder $54_2$, a high level clipper $53_6$ and a second two-input adder $54_3$.

Direct (+) and reverse (−) inputs of subtractor $55_2$ receive respectively the signal $K_j$ from the output of the AND circuit $51_2$ and the signal $KE_j$ from output of the AND circuit $51_3$ to produce a difference signal $K_j - KE_j$ applied to a first input of the AND circuit $51_7$. A second input of the AND circuit $51_7$ receives the black fade control signal $FN_j$. Thus when a black fade of the image on plane $P_j$ is controlled by $fn_j = 1$, the black level control signal $K_j = KE_j$ transmitted by circuit $51_7$ varies complementarily to the plane chopping signal $K_j$ relatively to the black dissolve signal $TP_j$, i.e., when at the level of the upgoing and downgoing transitions of signal $TP_j$ and for $TP_j < K_j$, signal $K_J = KE_j$ is a function of $K_j \cdot (1 - TP_j) = K_j - K_j \cdot TP_j$. When $fn_j = 0$ and thus when there is no black cross fade, the AND circuit $51_7$ is switched off.

In case of darkening in an image region, signal $KE_j \times AS_j$ represents the attenuation of the plane chopping signal. In this region, the plane image is cross faded with darkening $KE_j \times AS_j$. To take into account this darkening in control signal $CN_j$, the output of multiplication circuit 59 is connected to a first input of adder $54_2$. In the event of there being both a black fade and a darkening, these two effects are added by adder $54_2$, the latter having a second input connected to the output of AND circuit $51_7$. The black level control signal $CN_j$ supplied by the output of adder $54_2$ is clipped to 1 V in clipper $53_6$. Then the signal $CN_j$ is applied, firstly to an input of the black image control circuit 3 so as to be added to the other signals $CN_1$ to $CN_J$ into the DN signal, secondly to an input of adder $54_3$ having another input receiving the signal $D_j$ from the output of AND circuit $51_6$ so as to apply signal $D_j + CN_j$ to inverters-summators $57_1$ in the operator circuits $2_{j+1}$ to $2_J$ and thus eliminate the level drop of the chopping signal $D_j$ during black level fades and darkenings, shades or areas around spots.

It is observed that during the line and field synchronizing and blanking intervals, the 1 V level is imposed by the signal SLM on the signal DN derived in the black image control circuit 3 thereby notably enabling the passage of the color reference signals included in the black image signal IN.

According to a second embodiment shown schematically in FIG. 12, a mixer device comprises a second mixer 1' receiving a black image signal IN' and J' color TV image signals $IM_1$ to $IM_J$, and a set of J' operator circuits $2'_1$ to $2'_{J'}$, and a black image control circuit 3' controlling mixer 1'. Signals IN, IN', $IM_1$ to $IM_J$ and $IM'_1$ to $IM'_{J'}$ are synchronous with the SLM signal. The integer numbers J and J' can be equal or different and the video sources transmitting the incoming video signals can be the same or relatively different relating to the two mixers. According to this second embodiment, the mixer device includes a double output stage D4 whereby signals IR and IR' outgoing from mixers 1 and 1' and resulting from combinations of incoming video signals IN and $IM_1$ to $IM_J$ and IN' and $IM'_1$ to $IM'_{J'}$ respectively can be switched-over as required, thereby transmitting at choice one of of the signals IR and IR' to a broadcasting antenna and the other of these signals to a TV monitor preparing the images to be televised.

Output stage D3 has two input terminals 41 and 41' receiving the signals IR and IR' which are respectively applied to two operational amplifiers 42 and 42' of type TDB 2022 already referred to. The switching, of more Precisely the permutation of the signals IR and IR' is obtained via two switching circuits 43 and 43', as described in French patent NO. 2,484,109. Drains of two field effect transistors in each of circuits 43 and 43' are connected to the outputs of amplifiers 42 and 42'. Sources of the two pairs of transistors included in circuits 42 and 42' transmit respectively the signals IR and IR', permutated or not, to an antenna output 45 and a preparation output 45' through two adjustable gain output amplifiers 44 and 44'.

A control signal COM is applied to the gates of the field effect transistors via differential amplifiers included in circuits 43 and 43' and thus controls the direct transfer of the signals IR and IR' to outputs 45 and 45', or the permutation of the latter, to transmit the signals IR and IR' to outputs 45 and 45'. in practice, after preparation and display of the future image IR', during the broadcast of an image IR, permutation takes place so as to broadcast the image IR' in place of the image IR and to prepare a new image from mixer 1.

It is observed that in FIG. 6, the output stage 4 can be replaced by output stage D4 so as to apply on input 41' a black image signal to produce, if required, a black fade of image IR outgoing from mixer 1 and applied to input 41.

Figure 13:
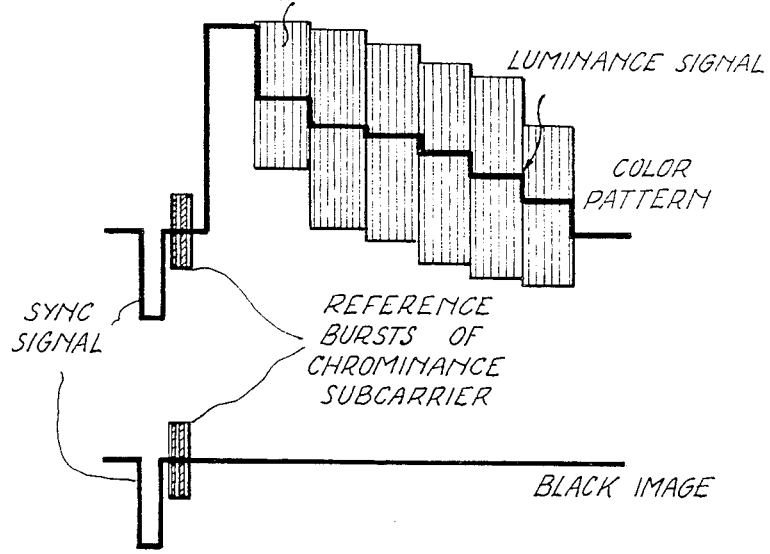
FIG. 13 is a waveform diagram showing two PAL video signals relating to test pattern and a black image line respectively.

As already stated, the incoming video signals are encoded according to the same standard, which can be the NTSC or PAL standard. The mixer devices shown in FIGS. 6 and 12 as described, can be used directly for these encoded video signals. For example, referring to PAL signals shown in FIG. 13, the mixer device is able to transmit directly, under the control of the logic line and field synchronizing and blanking signal SLM, the line synchronizing pulse and the reference bursts of the chrominance subcarrier on the back line blanking porch of the black image signal, and the black blanking level of the black image signal IN or IN' without suffering any impairment. Moreover, it is noticed that each incoming signal crosses mixer 1 or 1', along identical paths, implying that the phasing-in and synchronization of the incoming signals are preserved on output from the mixer, after combination. Moreover, chopping signals $D_1$ to $D_J$ have a low band width, approximately 1.5 MHz, and when they operate in multipliers $15_1$ to $15_N$ to express the effects selected in the operator circuits, they do not enter any frequency components that might be picked up in the resultant signal, such as spectrum components of the chrominance subcarrier.

Figure 14:
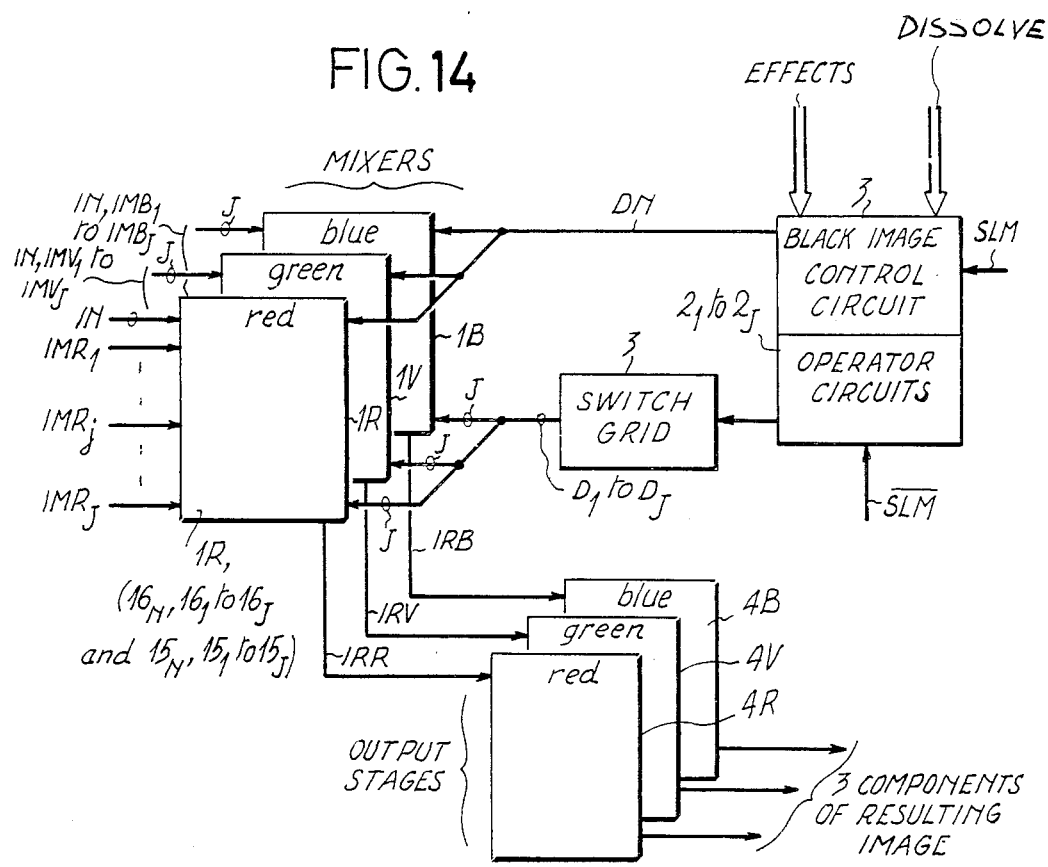
FIG. 14 is a schematic block diagram of a third embodiment of a mixer device receiving incoming composite signals associated with primary colors.

The principle of the mixer device shown in FIG. 6 can be also used when each image to be combined is represented by three component signals associated to the three primary colours red R, green V and blue B. In an embodiment shown in FIG. 14, a mixer device comprises, in place of mixer 1, three mixers 1R, 1V and 1B receiving respectively the component signals $IMR_1$ to $IMR_J$, $IMV_1$ to $IMV_J$ and $IMB_1$ to $IMB_J$ associated to the red, green and blue colors of images supplied by video sources, and in place of output stage 4, three output stages 4R, 4V and 4B receiving resultant component signals IRR, IRV and IRB derived by mixers 1R, 1V and 1B respectively. A same chopping signal such as that $D_j$ derived by operator circuit $2_j$, controls simultaneously, through a single switch grid 3 common to the three mixers, the special effects for the three component signals $IMR_j$, $IMV_j$ and $IMB_j$ outgoing from the associated video source. Moreover, mixers 1R, 1V and 1B receive three identical black image signals IN. Any other embodiment, more complex, of the type shown in FIG. 12 in view of mixing component signals of primary color, is also possible.

Figure 15:
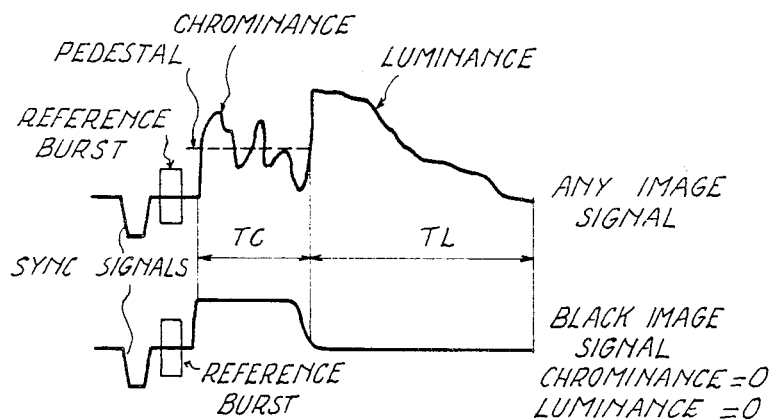
FIG. 15 is a waveform diagram showing two known MAC signals relating to a television line of any image and a television line of a black image respectively.

According to another embodiment, the incoming video signals can MAC type signals, now in process of normalization, based on compression and time multiplexing of the analog luminance and chrominance components into a packet in each of the lines the abbreviation MAC means "multiplex analog components". FIG. 15 shows this signal for any line, and a ling at black level; a 350 mV pedestal above the black level during the time intervals occupied by the chrominance signals is included in all types of MAC signals. In this case, it is necessary to take certain precautions indicated below, in connection with the effect signals in order to derive chopping signals $D_1$ to $D_J$ compatible with the MAC signals.

The effects of inserts, title insertion and other inlays and shaded or colored backgrounds by shutters obtained in circuits 21 and 23 of an operator circuit, such as circuit $2_j$, are obtained by operating simultaneously in time intervals TC and TL assigned to the chrominance and luminance respectively. Between the chopping signal $D_j$ output from operator circuit $2_j$, i.e., between the output of the AND circuit $51_6$ (FIG. 10) and the corresponding input $11_j$ of the switch grid 12, a chop doubling and compressing circuit is inserted. For each line in the MAC signal, this latter circuit compresses signal $D_j$ a first time, like the compression applied to the chrominance signals during the interval TC, and a second time the $D_j$ signal, like the compression applied to the luminance signal during the interval TL. The two compressed chopping signals are then added. In this case, the signal of the resultant image outgoing from the mixer is duly an MAC signal having a chrominance pedestal originating sometimes partially from the signal of one of the images to be combined, sometimes from another image, the pedestal of the resultant signal being included within accepted tolerances for incoming signal pedestals.

On a cross fade prepared from signals $TP_j$ with $f_j=1$ in circuit 23 (FIG. 10) of circuit $2_j$, signal $IM_j$ is attenuated by a factor $\alpha_j$ and another incoming signal such as signal $IM_{j+1}$ is attenuated by a factor $\alpha_{j+1}=1-\alpha_j$. Even if these factors are not entirely complementary, it results from the operating principle of the mixer referred to in FIG. 7 that the outgoing resultant signal IR has the same amplitude as signals $IM_j$ and $IM_{j+1}$ when the latter have equal amplitudes; the chrominance pedestal of the incoming MAC signals is thus preserved in the signal IR. If the values of the pedestals in the signals $IM_j$ and $IM_{j+1}$ are different, for example by $\Delta P_j$ and $\Delta P_{j+1}$ in relation to the nominal standard pedestal value, the error $\Delta P$ on the pedestal in the IR signal is $\Delta P = \alpha_j \cdot P_j + (1-\alpha_j) \Delta P_{j+1}$ and is thus less than the maximum acceptable tolerance.

When a black fade is controlled by signal $fn_j$ in circuit 23 of circuit $2_j$, i.e., when a cross fade of image $IM_j$ with the black image IN is controlled, the chrominance pedestal is restored in the resultant signal IR, as a result of the previous observations for a cross face. The same applies when a shade or spot effect is selected in circuits 24 of the operator circuit.

For a superimposing effect is used, for example, an effect signal applied to a circuit 21 and similar to the "gain control signal" derived by the "gain control circuit" described in my French patent application No. 2,576,733 corresponding to U.S. patent application Ser. No. 823,249 of Jan. 28, 1986.

Moreover, insofar as concerns information contained in the line and field blanking intervals, they are different according to the types of used MAC signals. For example, with a D2-MAC-packet signal, line synchronization bits, fields synchronization bits and sound data channel bits together with digital chrominance bursts are transmitted during the line and field synchronizing and blanking intervals. In order for the bits not to be affected by the mixing of the incoming MAC signals, these bits are extracted on input to the mixer device, and reentered on output from the mixer device. Nevertheless, the suppression of these bits on input is not mandatory, if special precautions are taken as to the levels of the clamp pulses CLP in the input stages so as not to disturb the black level restore.

What I claim is:

1. A device for mixing plural incoming video signals into a resultant. mixed video signal, each of said incoming video signals respectively representing incoming images, said mixed video signal representing an image resulting from superimposition of said incoming images, said device comprising plural means for deriving first signals for controlling attenuation of the incoming video signals, each of said first signals having an amplitude varying between predetermined low and high levels, said first signals having an amplitude sum no greater than said high level, switching means for selectively associating said first signals with said video incoming signals, and plural means for attenuating said incoming video signals as a function of said associated first signals, each of said attenuating means being responsive to one of said incoming video signals and an associated one of said first signals and connected to a common output terminal, said mixed video signal being thereby derived at said common output terminal, the incoming video signal supplied to each of said means for attenuating being attenuated in said means for attenuating by an attenuation factor respectively dependent on the magnitude of said first signal associated with said means for attenuating, said attenuation factors having a sum equal to unity.

2. The device of claim 1, wherein each of said chopping, attenuating and adding means comprises a variable resistance circuit having an input responsive to said incoming video signal associated therewith to couple a signal to said common output terminal, each of said variable resistance circuits being controlled in response to a voltage of the chopping and attenuating signal associated therewith.

3. The device of claim 2 wherein each of said circuits comprises a field effect type transistor, each of said transistors having a drain responsive to said respective incoming video signal, a gate responsive to said associated first signal and a source connected to supply a signal to said common output terminal.

4. The device of claim 1 wherein said switching means has a pass-band of about 1.5 MHz.

5. The device of claim 1 wherein each of said deriving means comprises an analog inverter-summator for deriving a complementary signal having at said high level a value equal to the sum of said first signals for processing said incoming images in planes superimposed above a plane of an image processed by said first signal derived by said deriving means, and means responsive to a combined-effect signal clipped to said high level and said complementary signal of said first signal sum for producing said first signal having an amplitude substantially equal to a lowest amplitude of said combined-effect signal and said complementary signal, said combined effect signal and said complementary signal having a predetermined range between said lowest amplitude and said highest amplitude.

6. The device of claim 5 wherein said wherein said deriving mean comprises means for combining plural signal effect signals determining respectively plural special image effects thereby producing said combined-effect signal.

7. The device of claim 1, wherein each of said first signal deriving means comprises means activated by a black fade control signal and responsive to a black dissolve signal for deriving a black level control signal that varies according to a complement of a predetermined plane processing signal relative to said black dissolve signal, and that forms said first signal, and further comprising means for adding the black level control signal derived by each of said deriving means into a resultant black level control signal, and means responsive to an additional incoming video signal representing a black image connected to supply a signal to said common output terminal and similar to said attenuating means for creating said black image representing signal as a function of said resultant black level control signal.

8. The device of claim 7 further comprising means for imposing said low level on said first signals and imposing said high level on said resultant black level control signal during line and field synchronizing and blanking intervals of said incoming video signals.

9. The device of claim 7 wherein a plane chopping signal is provided for each of several superimposed planes from a lowest plane to a highest plane, said black level control signal supplying means comprising means for deriving said black dissolve signal in response to a predetermined state of said black fade control signal, means for deriving a plane chopping signal for the lowest plane of all said planes and said black dissolve signal, and means for subtracting said lowest plane chopping signal from said plane chopping signal into a difference signal forming said black level control signal.

10. The device of claim 9 wherein each of said first signal deriving means further comprises an analog inverter-summator for producing a complementary signal at said high level of said sum of said first signals for processing said incoming means in planes superposed above a plane of the image processed by said first signal derived by said deriving means, and means responsive to an effect signal clipped to said high level and said complementary signal of the sum of said first signals for producing said first signal having an amplitude substantially equal to a lowest amplitude of said effect signal and said complementary signal, said combined effect signal and said complementary signal having a predetermined range between said lowest amplitude and said highest amplitude, and wherein said black level control signal supplying means receives, as a predetermined plane chopping signal, a smallest of said effect signals and said complementary signal and further comprises means activated by said black fade control signal for adding said lowest plane chopping signal and said black level control signal into an addition signal thereby applying said addition signal to each inverter-summator included in said deriving means associated with lower image planes.

11. The device of claim 9 wherein said black dissolve signal deriving means respectively responds to control logic signals for selectively deriving a zero voltage, an analog cross fade signal having an amplitude varying between said high and low levels, and shutter signals including d.c. voltage levels varying between said high and low levels.

12. The device of claim 1 wherein each of said deriving means comprises means for fading said chopping and attenuating signal thereby creating dissolve darkenings in said image represented by said incoming video signal associated with said chopping and attenuating signal.

13. The device of claim 9 wherein each of said first signal deriving means comprises means responsive to first respective control signals for selecting one of plural analog shade signals having predetermined levels, means responsive to second respective control signals for selecting one of plural analog spot effect signals, adding and chopping means for adding the selected shade signal and the selected spot effect signal into a darkening signal clipped to said high level, and means for analog multiplying said darkening signal and said lowest plane chopping signal and said black dissolve signal into a product signal, and means for subtracting from said lowest plane chopping signal and said product signal thereby to derive said chopping signal.

14. The device of claim 13 wherein said deriving means comprises means for adding said product signal and said difference signal into a sum signal forming said black level control signal.

15. The device of claim 1, wherein said incoming video signals and said mixed video signal are video signals conforming to a color TV standard, such as PAL or NTSC.

16. The device of claim 1, wherein said incoming video signals and said mixed video signal are "multiplex analog component" type signals and further including means for compressing said chopping and attenuating signals in time intervals assigned to transmission of luminance and chrominance in said incoming video signals similarly to compressions respectively applied to luminance and chrominance signals included in said incoming video signals.

17. The device of claim 1 further comprising three groups of plural chopping, attenuating and adding means respectively responsive to three incoming component signal groups associated with three primary colors, a same chopping and attenuating signal being applied to means for chopping, attenuating and adding incoming component signals derived from a single video source.

* * * * *